(12) United States Patent
Ko et al.

(10) Patent No.: US 8,804,041 B2
(45) Date of Patent: Aug. 12, 2014

(54) METHOD OF CONTROLLING RESOLUTION OF DIGITAL DATA BROADCASTING RECEIVER, APPARATUS THEREFOR, AND DIGITAL DATA BROADCASTING RECEIVER USING THE SAME

(71) Applicant: Samsung Electronics Co., Ltd., Gyeonggi-do (KR)

(72) Inventors: Hye-kyung Ko, Incheon Metropolitan (KR); Soo-kang Bae, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/057,657

(22) Filed: Oct. 18, 2013

(65) Prior Publication Data

US 2014/0043532 A1    Feb. 13, 2014

Related U.S. Application Data

(63) Continuation of application No. 13/416,682, filed on Mar. 9, 2012, now Pat. No. 8,570,440, which is a continuation of application No. 11/606,112, filed on Nov. 30, 2006, now Pat. No. 8,174,618.

(30) Foreign Application Priority Data

Nov. 30, 2005    (KR) .................. 10-2005-0115846

(51) Int. Cl.
*H04N 5/50*    (2006.01)
*H04N 3/27*    (2006.01)

(52) U.S. Cl.
USPC ......................................... 348/569; 348/554

(58) Field of Classification Search
CPC ..... H04N 21/47; H04N 5/4401; H04N 5/445; H04N 7/0122; H04N 7/0117; H04N 7/015; H04N 21/47205; G09G 5/36; G09G 2340/04; G09G 2340/0407; G09G 2340/0421; G06T 3/40
USPC ................. 348/554, 555, 569, 441, 458, 706; 345/589, 698, 699, 660; 386/232, 240, 386/243, 219, 220; 382/298–300
See application file for complete search history.

(56) References Cited

U.S. PATENT DOCUMENTS

| | | | |
|---|---|---|---|
| 5,572,444 A | 11/1996 | Lentz et al. | |
| 6,028,643 A | 2/2000 | Jordan et al. | |

(Continued)

FOREIGN PATENT DOCUMENTS

| | | |
|---|---|---|
| CN | 1578434 A | 2/2005 |
| CN | 1426232 A | 6/2006 |

(Continued)

OTHER PUBLICATIONS

Communication dated Jun. 28, 2007 from the Korean Intellectual Property Office in counterpart application No. 10-2005-0115846.

*Primary Examiner* — Victor Kostak
(74) *Attorney, Agent, or Firm* — Sughrue Mion, PLLC

(57) ABSTRACT

Provided are a method of controlling a resolution desired by a user in a graphics device of a digital data broadcasting receiver, an apparatus therefor, and a digital data broadcasting receiver using the same. The method includes providing a list of resolutions available on a graphic plane to a user; changing a resolution of the graphic plane according to a resolution selected by the user from the resolution list; and displaying an application on the graphic plane, the resolution of which has been changed.

7 Claims, 6 Drawing Sheets

(56) References Cited

U.S. PATENT DOCUMENTS

| | | |
|---|---|---|
| 6,677,979 B1 | 1/2004 | Westfield |
| 7,551,190 B2 | 6/2009 | Shiomi et al. |
| 7,853,121 B2 | 12/2010 | Yahata |
| 2002/0067515 A1 | 6/2002 | Abe |
| 2002/0188413 A1 | 12/2002 | Borg |
| 2005/0038675 A1 | 2/2005 | Siekman et al. |
| 2005/0122342 A1* | 6/2005 | Miyamoto et al. ............ 345/589 |
| 2006/0182425 A1 | 8/2006 | Boerger et al. |
| 2009/0044120 A1 | 2/2009 | Miyamoto et al. |
| 2012/0114298 A1* | 5/2012 | Hamada et al. ................ 386/230 |
| 2012/0189275 A1* | 7/2012 | Hamada et al. ................ 386/244 |

FOREIGN PATENT DOCUMENTS

| | | |
|---|---|---|
| EP | 1328114 A1 | 7/2003 |
| JP | 2002-84474 A | 3/2002 |
| KR | 1999015184 A | 3/1999 |
| KR | 10-2003-0048983 A | 6/2003 |
| KR | 10-2004-0062277 A | 7/2004 |
| KR | 10-2005-0009954 A | 1/2005 |

* cited by examiner

METHOD OF CONTROLLING RESOLUTION OF DIGITAL DATA BROADCASTING RECEIVER, APPARATUS THEREFOR, AND DIGITAL DATA BROADCASTING RECEIVER USING THE SAME

CROSS-REFERENCE TO RELATED PATENT APPLICATION

This application is a continuation of U.S. application Ser. No. 13/416,682, filed Mar. 9, 2012, which is a continuation of U.S. application Ser. No. 11/606,112, filed on Nov. 30, 2006, which claims priority from Korean Patent Application No. 10-2005-00115846, filed on Nov. 30, 2005, in the Korean Intellectual Property Office, the disclosures of which are incorporated herein in its entirety by reference.

FIELD OF THE INVENTION

Methods and apparatuses consistent with the present invention relate to a digital data broadcasting receiver, and more particularly, to a method of controlling a resolution desired by a user in a graphics device of a digital data broadcasting receiver, an apparatus therefor, and a digital data broadcasting receiver using the same.

DESCRIPTION OF THE RELATED ART

Digital data broadcasting is a service of transmitting text, pictures, graphics, sound, images, program packages, and multimedia data to terminals, such as set-top boxes, computers, and portable phones, at a very high speed. The digital data broadcasting provides broadcasting programs and related program information, life information, electronic commerce, and interactive entertainment using communication media such as cable, terrestrial wave, and satellite wave.

The digital data broadcasting provides various programs to users through a number of channels and also provides various applications to provide more interactive information and various kinds of information to users. The applications are Java virtual machine (JVM) based application programs executed in a digital data broadcasting receiver. The applications are transmitted from a broadcasting station, tuned by a user's request, and loaded by the digital data broadcasting receiver.

In general, the digital data broadcasting receiver displays an image by classifying display planes into three planes.

FIG. 1 illustrates display planes existing in middleware of a digital data broadcasting receiver according to the related art. The middleware is a kind of software for connecting applications to each other and allowing the applications to exchange data with each other. That is, the middleware is a software for achieving a smooth data exchange between one application and another application, and one operating device and another operating device in a complex heterogeneous environment. The middleware is also a solution used to operate fundamental functions, such as power on/off, a channel change, and various application functions, such as electronic program guide (EPG), video on demand (VOD), and home shopping, regardless of manufacturers of digital data broadcasting receivers.

Referring to FIG. 1, the display planes of the digital data broadcasting receiver are largely classified into a background plane, a video plane, and a graphic plane.

The background plane, which is a plane on which a single color is presented or a still image is displayed, displays an image existing farthest from a user's vision.

The video plane above the background plane is a plane on which a video image is displayed. That is, as illustrated in FIG. 1, the video plane is a plane on which a broadcasting program transmitted from a broadcasting station is displayed.

The graphic plane above the video plane is a plane on which applications implemented according to various digital data broadcasting standards, e.g., the Advanced Common Application Platform (ACAP), the OpenCable Application Platform (OCAP), and the Multimedia Home Platform (MHP), are displayed in reality.

Although each of the background plane, the video plane, and the graphic plane can have a different resolution and be implemented individually, the three planes are eventually combined into a single screen.

The digital data broadcasting standard, such as the OCAP or the ACAP, provides a Java application programming interface (API) for controlling each of the display planes. The background plane can be controlled using an 'HBackgroundDevice' class, the video plane can be controlled using an 'HVideoDevice' class, and the graphic plane can be controlled using an 'HGraphicsDevice' class.

The graphic plane must fundamentally support at least each one of standard definition (SD)-class resolution and high definition (HD)-class resolution and can optionally support additional resolutions. Several applications can coexist on the graphic plane. If an application having a 640×480 window is transmitted from a broadcasting station and the graphic plane of the digital data broadcasting receiver is set to an SD-class 640×480 resolution, the application is output to a full screen. If the graphic plane of the digital data broadcasting receiver is set to an HD-class 960×540 resolution, the application cannot be output to a full screen.

FIGS. 2A and 2B illustrate applications 21 and 22 displayed on the graphic plane of the digital data broadcasting receiver according to the related art. FIGS. 3A and 3B illustrate display states of the graphic plane of the digital data broadcasting receiver according to the execution order of the applications 21 and 22 of FIGS. 2A and 2B. It is assumed that the application 21 illustrated in FIG. 2A is realized based on an HD-class resolution and the application 22 illustrated in FIG. 2B is realized based on an SD-class resolution.

Referring to FIG. 3A, when the application 21 illustrated in FIG. 2A, which is realized based on an HD-class resolution, is executed, the graphic plane is set to a high resolution according to a high resolution of the application 21. Thereafter, if the application 22 illustrated in FIG. 2B, which is realized based on an SD-class resolution, is executed, the application 22 having a low resolution changes the resolution of the graphic plane to a low resolution, and accordingly, the application 21 having a high resolution exceeds the graphic plane.

Referring to FIG. 3B, when the application 22 illustrated in FIG. 2B, which is realized based on an SD-class resolution, is executed, the graphic plane is set to a low resolution according to a low resolution of the application 22. Thereafter, if the application 21 illustrated in FIG. 2A, which is realized based on an HD-class resolution, is executed, the application 21 having a high resolution changes the resolution of the graphic plane to a high resolution, and accordingly, the application 22 having a low resolution is one-sidedly displayed compared to its normal position.

As described above, according to the related art, in the case where a new application tries to change a resolution when a certain application has already been displayed on the graphic plane, if resolutions of the two applications are different, the already displayed application exceeds the graphic plane, or the new application is one-sidedly displayed at a position different from a desired one. That is, a resolution change of the graphic plane is performed by only applications without concerns with a user's selection right.

SUMMARY OF THE INVENTION

The present invention provides a method and apparatus for allowing a user to control a resolution of a graphic plane on which applications are displayed in a digital data broadcasting receiver.

According to an aspect of the present invention, there is provided a method of controlling a resolution of a graphic plane on which an application is displayed in a digital data broadcasting receiver, the method comprising: selecting one of a plurality of resolutions available on the graphic plane; changing the resolution of the graphic plane according to the selected resolution; and displaying the application on the graphic plane, the resolution of which has been changed.

The changing of the resolution of the graphic plane may further comprise trying to reserve a use right of a graphics device managing the graphic plane and obtaining the use right of the graphics device.

When the use right is not obtained even if the reservation of the use right of the graphics device managing the graphic plane is tried, a resolution change failure message may be output.

The method may further comprise informing modules of the digital data broadcasting receiver whether the resolution of the graphic plane has been changed.

According to another aspect of the present invention, there is provided an apparatus for controlling a resolution of a graphic plane on which an application is displayed in a digital data broadcasting receiver, the apparatus comprising: a user resolution manager which provides a list of resolutions available on the graphic plane; a resolution changer which changes the resolution of the graphic plane according to a resolution selected from the resolution list; and a display unit which displays the application on the graphic plane, the resolution of which has been changed.

The apparatus may further comprise a use right manager managing reservation and restoration of a use right of a graphics device managing the graphic plane, wherein the user resolution manager requests the use right manager to grant the use right of the graphics device according to the selected resolution.

The user resolution manager may output a resolution change failure message if the use right of the graphics device is not obtained from the use right manager.

The apparatus may further comprise a resolution change notifier which informs modules of the digital data broadcasting receiver whether the resolution of the graphic plane has been changed.

According to another aspect of the present invention, there is provided a digital data broadcasting receiver comprising: a tuner which receives a digital data broadcasting signal; a channel decoder which extracts an application from the digital data broadcasting signal received through the tuner; an application processing unit which processes the extracted application; a controller which provides a list of resolutions available on the graphic plane on which the processed application is displayed and changes a resolution of the graphic plane according to a selected resolution; and a display unit which displays the application on the graphic plane, the resolution of which has been changed.

When the resolution of the graphic plane is changed according to the selected resolution, the controller may inform modules of the digital data broadcasting receiver that the resolution of the graphic plane has been changed.

When the resolution of the graphic plane cannot be changed according to the selected resolution, the controller may output a resolution change failure message.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
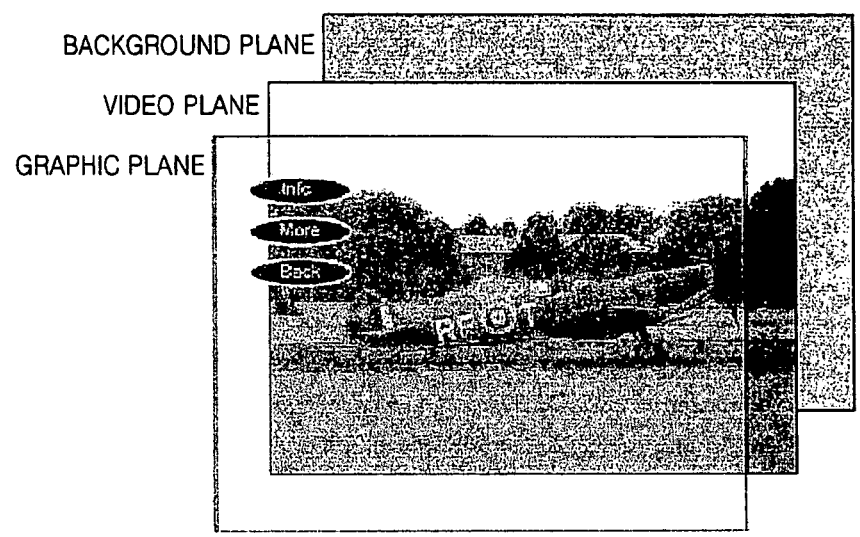
FIG. 1 illustrates display planes existing in middleware of a digital data broadcasting receiver according to the related art.
Figure 2A:
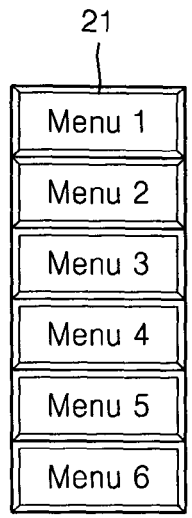
FIGS. 2A and 2B illustrate applications displayed on a graphic plane of the digital data broadcasting receiver according to the related art.
Figure 2B:
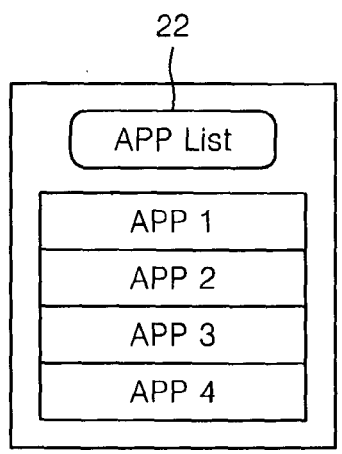
Figure 3A:
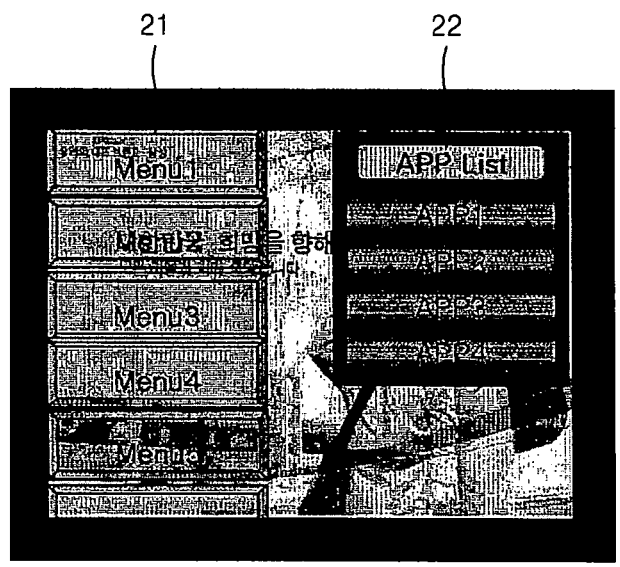
FIGS. 3A and 3B illustrate display states of the graphic plane of the digital data broadcasting receiver according to the execution order of the applications of FIGS. 2A and 2B.
Figure 3B:
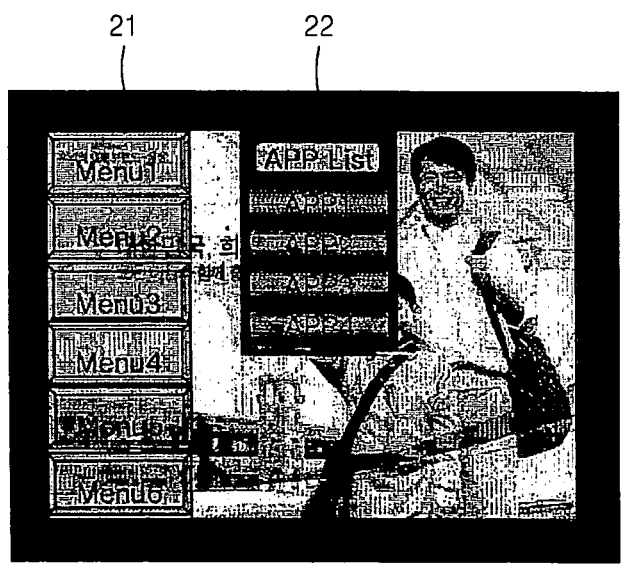
Figure 4:
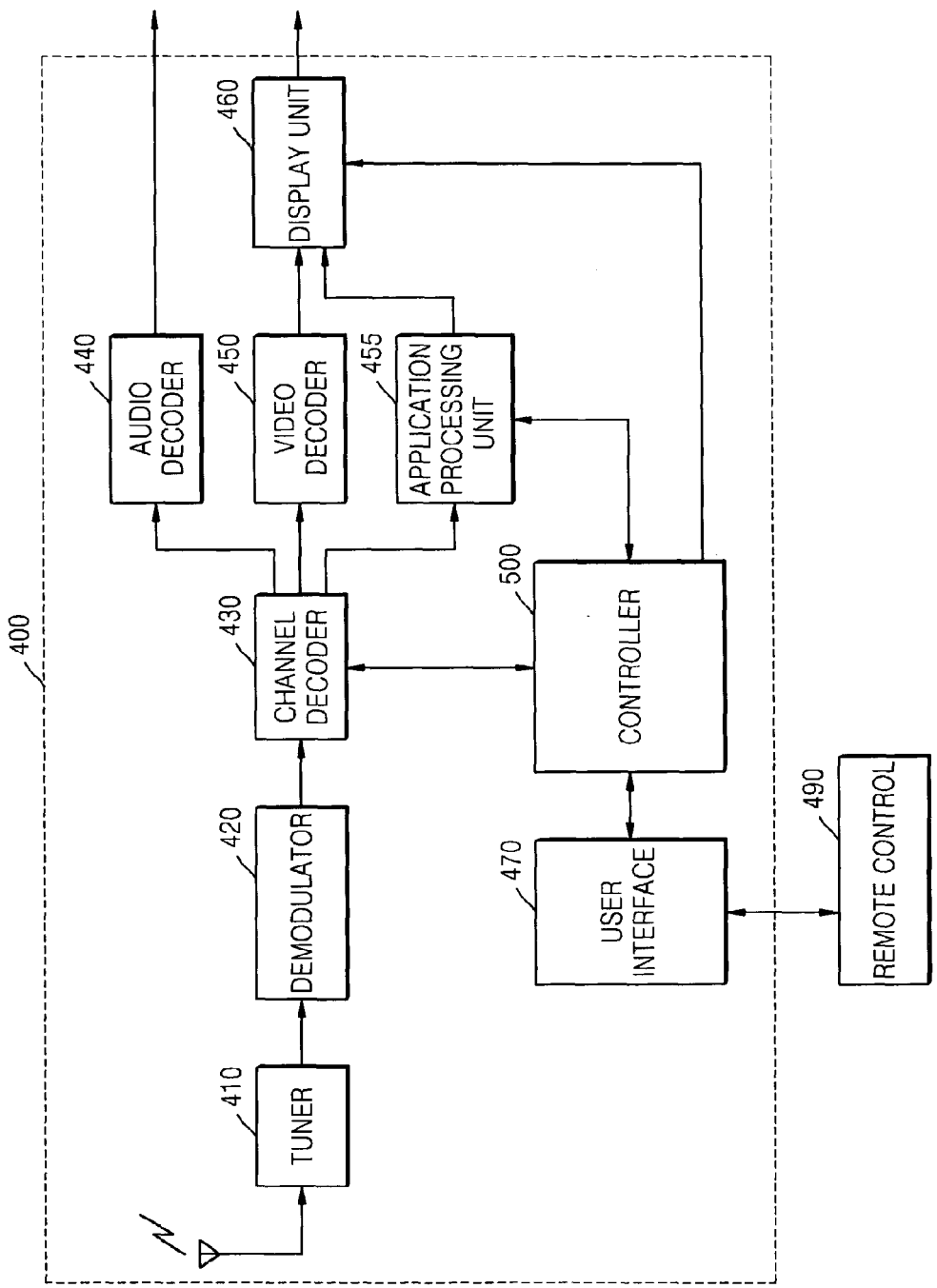
FIG. 4 is a block diagram of a digital data broadcasting receiver according to an exemplary embodiment of the present invention.

FIG. 4 is a block diagram of a digital data broadcasting receiver 400 according to an exemplary embodiment of the present invention.

Referring to FIG. 4, the digital data broadcasting receiver 400 includes a tuner 410, a demodulator 420, a channel decoder 430, an audio decoder 440, a video decoder 450, an application processing unit 455, a display unit 460, a user interface 470, a remote control 490, and a controller 500.

The digital data broadcasting receiver 400 receives a digital data broadcasting signal including video, audio and application through an antenna.

The application supported by digital data broadcasting and displayed on the graphic plane is made by predetermined content producers and transmitted from a broadcasting station and can be any type of applications. Examples of the application are an application for purchasing products used in a drama during a video service, an application providing character information and/or outline information of a drama, an application for watching a scene at several angles in a sports broadcasting service, and an application for transmitting or receiving an e-mail or a short message separately from a provided video or audio service. Examples of a configuration of the application can include an execution file (*.exe), a configuration file (*.cfg) indicating a characteristic related to settings of the application, an icon file (*.icon) indicating graphics, and a data file (*.data) having user available data.

The tuner 410 receives a modulated signal and outputs the modulated signal to the demodulator 420. The demodulator 420 generates a transport stream by demodulating and error correcting the modulated signal input from the tuner 410, and outputs the generated transport stream to the channel decoder 430.

The channel decoder 430 extracts video and audio data of a channel, which is selected by a user operating the remote control 490, from the input transport stream in which video, audio, and application data of a plurality of channels are time-division-multiplexed, and respectively outputs the extracted audio and video data to the audio decoder 440 and video decoder 450. The channel decoder 430 also extracts application data from the input transport stream, and outputs the extracted application data to the application processing unit 455. The application processing unit 455 processes the input application data and can store the processed application data in a memory (not shown) or provide the processed application data to the display unit 460 to immediately display it.

The audio decoder 440 decodes the audio data input from the channel decoder 430, and the video decoder 450 decodes the video data input from the channel decoder 430 and provides the decoded video data to the display unit 460 to display it on a screen of the display unit 460.

The controller 500 controls the components included in the digital data broadcasting receiver 400. The controller 500 provides a resolution list to the user so that the user can select a resolution of the graphic plane on which the application is displayed, and changes the resolution of the graphic plane according to the resolution selected by the user.

The user can select a desired channel or the resolution of the graphic plane on which the application is displayed by directly operating the remote control 490 or a function key included in the digital data broadcasting receiver 400. The resolution selected by the user is transmitted to the controller 500. Then, the controller 500 changes the resolution of the graphic plane according to the resolution selected by the user, and the display unit 460 re-displays the input application according to the changed resolution.

Figure 5:
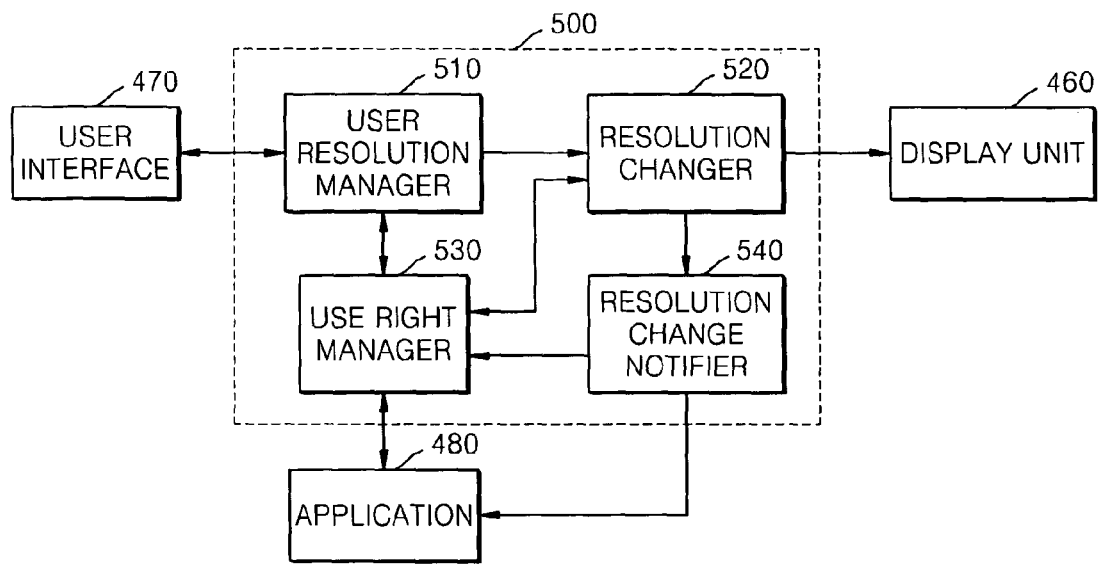
FIG. 5 is a block diagram of a controller of FIG. 4.
Figure 6:
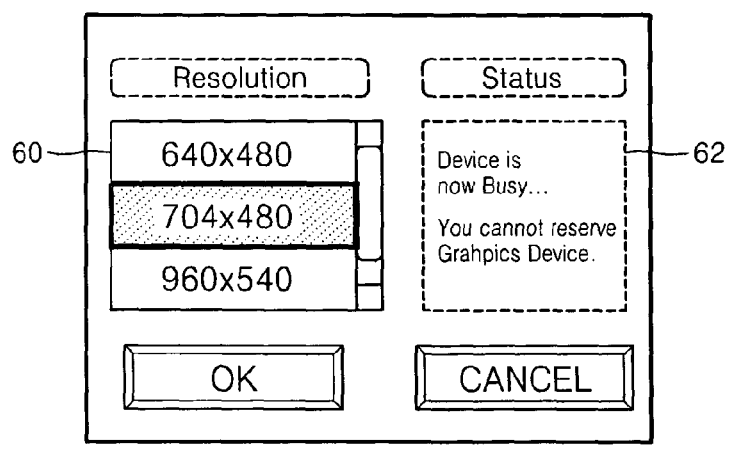
FIG. 6 illustrates a resolution list selection screen provided by a user resolution manager of FIG. 5.

FIG. 5 is a block diagram of the controller 500 of FIG. 4, and FIG. 6 illustrates a resolution list selection screen provided through the user interface 470 by the user resolution manager 510 of FIG. 5.

Referring to FIG. 5, the controller 500 includes a user resolution manager 510, a resolution changer 520, a use right manager 530, and a resolution change notifier 540.

The user resolution manager 510 displays a list 60 of resolutions, which the digital data broadcasting receiver 400 can provide, through the user interface 470. Thereby, the user can set a desired resolution through an input device such as the remote control 490. As described above, when more than two applications coexist on the graphic plane, a display state of the applications having different resolutions may be changed, and thus, the resolution list 60 is provided to the user to give the user a resolution selection right so that a particularly concerned application can be normally displayed.

The resolution selected by the user is transmitted to the user resolution manager 510, and then, the user resolution manager 510 tries to reserve a use right of a graphics device (not shown) managing the graphic plane to the use right manager 530. All modules of the digital data broadcasting receiver 400 must obtain the use right of the graphics device before using the graphics device because a collision can occur if the use right is granted to another module before a certain module, which has obtained the use right of the graphics device, returns the use right. Thus, the use right manager 530 manages reservation and restoration of the use right of the graphics device among the modules of the digital data broadcasting receiver 400. The graphics device is a device, which is constructed of hardware and software, controlling a general operation, which includes the resolution management, of the graphic plane. For example, according to the OCAP or ACAP digital data broadcasting middleware standard, the graphics device may be the HGraphicDevice class.

If the graphics device is available, the use right manager 530 grants the use right of the graphics device to the user resolution manager 510 in response to a request of the user resolution manager 510 and prevents other modules, e.g., another application, from changing the resolution of the graphic plane by informing the resolution changer 520 of the grant of the use right.

If the graphics device is being used by another module of the digital data broadcasting receiver 400, i.e., if the resolution cannot be changed by a user's selection, as a result of determining whether the graphics device is available in response to a request of the user resolution manager 510, the use right manager 530 informs the user resolution manager 510 that the graphics device is busy and can output a resolution change failure message in a predetermined state display window 62 provided by the user interface 470, as illustrated in FIG. 6.

The resolution changer 520 changes the resolution of the graphic plane to a resolution selected by the user from the resolution list 60 in response to a request of the user resolution manager 510, which has obtained the use right of the graphics device.

The display unit 460 newly displays the application processed by the application processing unit 455 on the graphic plane, the resolution of which has been changed by the user's selection.

If the resolution of the graphic plane is changed by the user's selection, the resolution changer 520 informs the resolution change notifier 540 of the resolution change of the graphic plane. The resolution change notifier 540 informs each module of the resolution change in order to prevent the resolution selected by the user from being re-changed by other modules. That is, by informing the use right manager 530 and an application 480, which is being executed in the digital data broadcasting receiver 400, of the resolution change, the resolution selected by the user can be prevented from being re-changed. To do this, modules, which are affected by the resolution of the graphic plane or affect it, can be previously registered to the resolution change notifier 540, and then when the resolution is changed, the modules can receive the resolution change as an event.

Figure 7:
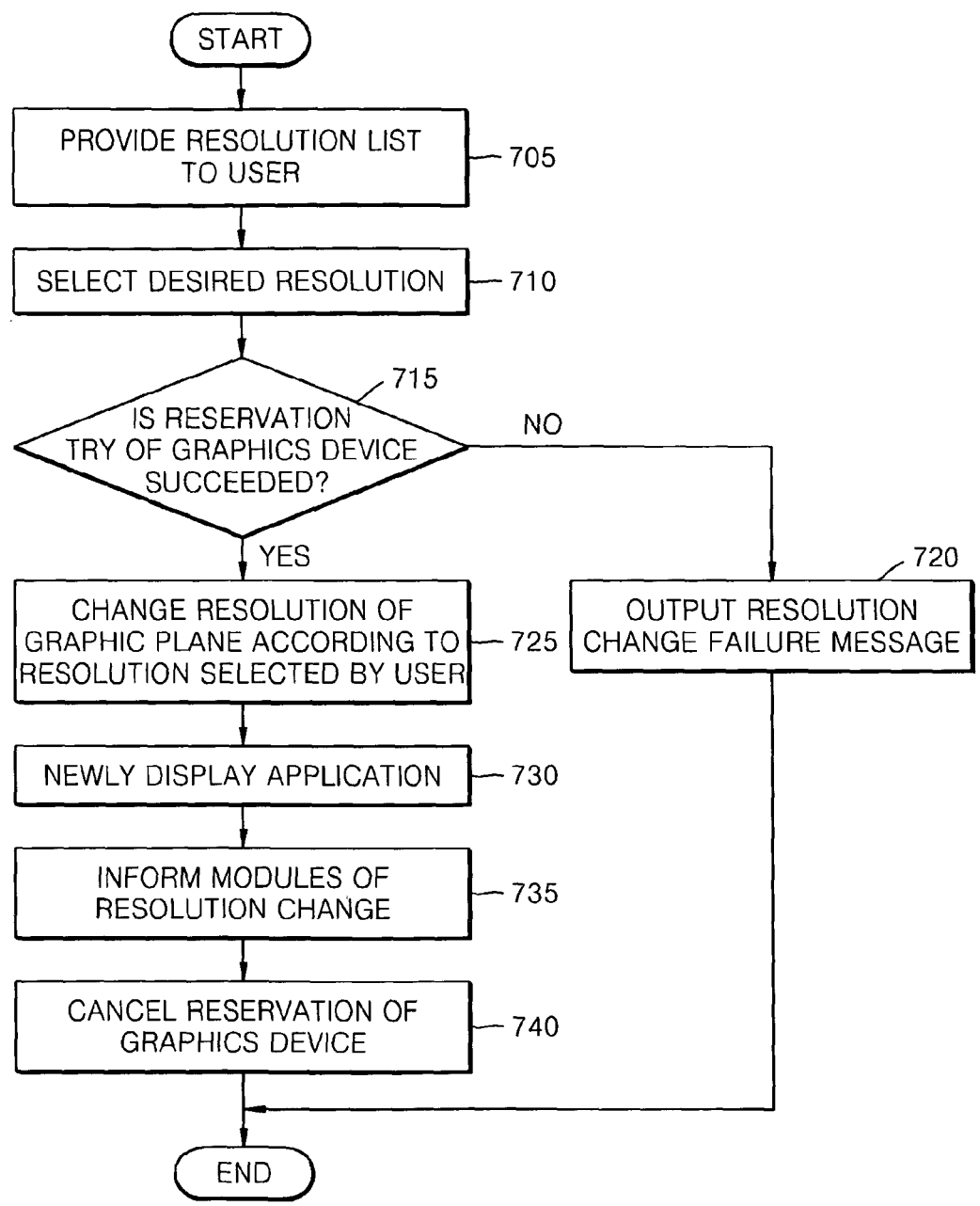
FIG. 7 is a flowchart illustrating a method of controlling a resolution of a graphic plane in a digital data broadcasting receiver according to an exemplary embodiment of the present invention.

FIG. 7 is a flowchart illustrating a method of controlling a resolution of the graphic plane in the digital data broadcasting receiver 400 according to an exemplary embodiment of the present invention.

Referring to FIG. 7, in operation 705, the user resolution manager 510 provides a list of resolutions of the graphic plane, which can be provided by the digital data broadcasting receiver 400, through the user interface 470.

In operation 710, the user selects a desired resolution through an input device such as the remote control 490. In operation 715, the user resolution manager 510 tries to reserve a use right of a graphics device managing the graphic plane to the use right manager 530.

If another module of the digital data broadcasting receiver 400 is using the graphics device, in operation 720, the use right manager 530 informs the user resolution manager 510 that the graphics device is busy, and then, the user resolution manager 510 outputs a resolution change failure message.

If the graphics device is available, in operation 725, the resolution changer 520 changes the resolution of the graphic plane to a resolution selected by the user in response to a request of the user resolution manager 510, which has obtained the use right of the graphics device.

In operation 730, the display unit 460 newly displays an application processed by the application processing unit 455 on the graphic plane, the resolution of which has been changed by the user's selection.

In operation 735, the resolution changer 520 informs the resolution change notifier 540 that the resolution of the graphic plane has been changed by the user's selection, and then, the resolution change notifier 540 informs each module of the resolution change in order to prevent the resolution selected by the user from being re-changed by other modules.

In operation 740, the use right manager 530, which has received the resolution change notice, cancels the use right of the graphics device, which has been granted to the user resolution manager 510.

The method of controlling a resolution of a graphic plane according to the exemplary embodiments of the present invention can be implemented as computer programs. Codes and code segments for accomplishing the computer programs can be easily construed by programmers skilled in the art to which the present invention pertains. The computer programs are stored in a computer readable recording medium and embody the method of controlling a resolution of a graphic plane by being read by a computer and executed. Examples of the computer readable recording medium include magnetic storage media, optical recording media, and storage media such as carrier waves.

As described above, according to exemplary embodiments of the present invention, by allowing a user to select a resolution of a graphic plane at which an application is displayed, the resolution of the graphic plane can be prevented from being changed by an application included in a digital data broadcasting program regardless of a user's desire. In addition, the user convenience can be increased by allowing the user to set the resolution so that a specific application of interest can be normally displayed.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of controlling a graphic device managing a graphic plane on which an application is displayed in a digital data broadcasting receiver, the method comprising:

obtaining from a user, one of a plurality of resolutions available on the graphic plane;

changing the resolution of the graphic plane according to the obtained resolution; and outputting the application on the graphic plane, the resolution of which has been changed, wherein the changing of the resolution of the graphic plane further comprises notifying other applications of the resolution change in order to prevent the other applications from re-changing the resolution obtained from the user.

2. The method of claim 1, wherein the changing of the resolution of the graphic plane further comprises outputting a resolution change failure message if the use right of the graphics device managing the graphic plane is not obtained.

3. The method of claim 1, further comprising informing modules of the digital data broadcasting receiver whether the resolution of the graphic plane has been changed.

4. An apparatus for controlling a graphic device managing a graphic plane on which an application is displayed in a digital data broadcasting receiver, the apparatus comprising:

a user resolution manager which provides a list of resolutions available on the graphic plane;

a resolution changer which changes the resolution of the graphic plane according to a resolution selected from the resolution list by a user and outputs the application on the graphic plane, the resolution of which has been changed; and a use right manager which manages reservation and restoration of a use right of the graphic device managing the graphic plane, wherein the resolution changer notifies other applications of the resolution change in order to prevent the other applications from re-changing the resolution obtained by the user.

5. The apparatus of claim 4, wherein the user resolution manager outputs a resolution change failure message if the use right of the graphics device is not obtained from the use right manager.

6. The apparatus of claim 4, further comprising a resolution change notifier which informs modules of the digital data broadcasting receiver whether the resolution of the graphic plane has been changed.

7. A method of controlling a graphic device managing a graphic plane on which an application is displayed in a digital data broadcasting receiver, the method comprising:

receiving the application;

determining whether resolution of the graphic plane can be changed into resolution of the application selected by a user;

outputting the application on the graphic plane when the resolution of the graphic plane can be changed into the resolution of the application; and notifying other applications of the resolution change in order to prevent the other applications from re-changing the resolution selected by the user.

* * * * *